UNITED STATES PATENT OFFICE 2,240,275

HIGHLY BRANCHED BROMINATED ORGANIC ACIDS AND THEIR ESTERS

Frank C. Whitmore, State College, Pa., and August H. Homeyer, St. Louis, Mo., assignors to Mallinckrodt Chemical Works, St. Louis, Mo., a corporation of Missouri No Drawing. Application September 10, 1938, Serial No. 229,284

11 Claims. (Cl. 260—487)

This invention relates to highly branched halogenated organic acids, and with regard to certain more specific features, to acids corresponding to the type formula:

$$(CH_3)_2CR—(CH_2)_n—CBrY—COOR'$$

where R is a low alkyl or aryl, $n$ is a lower integer (including zero), Y is hydrogen, a hydrocarbon radical, an aryl-oxy-alkyl, an alkyl-oxy-alkyl, or a carboxy substituent, and R' is hydrogen or a hydrocarbon radical.

This application is in part a continuation of part of our copending application (together with C. I. Noll) Serial No. 64,338, filed February 17, 1936, which, as to the subject-matter here involved, was itself in part a continuation of part of our then copending application Serial No. 666,512, filed April 17, 1933, now Patent No. 2,034,850, granted March 24, 1936.

Among the several objects of the invention may be noted the provision of organic acids corresponding to the type formula given which, more particularly, are characterized in the inclusion in their structure of at least one carbon atom which is linked to four other carbon atoms (hereinafter referred to as a quaternary carbon atom). Other objects will be in part obvious and in part pointed out hereinafter.

The invention accordingly comprises the elements and combinations of elements, and features of composition, which will be exemplified in the products hereinafter described, and the scope of the application of which will be indicated in the following claims.

It has recently been determined that acids containing a large number of carbon atoms, particularly when such atoms are in a highly branched formation, exhibit a bactericidal effect to a remarkable degree. Such acids, for example, containing a relatively large number of carbon atoms are valuable in the treatment of bacteria leprae, the cause of leprosy. It is the purpose of the present invention to provide a series of such acids wherein the branching is carried to a considerable extent by means of a quaternary carbon atom in their structures, and which acids are brominated in order to enhance their various therapeutic effects, such as their bactericidal qualities.

The acids of the present invention are also useful as intermediates in connection with the preparation of certain derivatives such as esters, amides, ureides, and the like, which are of direct therapeutic benefit.

A general method of manufacturing brominated acids corresponding to the type formula set forth comprises brominating the acid in question, as with liquid bromine in the presence of a catalyst such as a small quantity of elemental phosphorus or sulfur or iodine, or a small quantity of sulfuryl chloride, $SOCl_2$, or phosphorus tribromide or trichloride, or in the sunlight, according to the general reaction:

$$RCOOH + Br_2 \rightarrow RBrCOOH + HBr$$

The bromine in such a reaction becomes attached to the carbon atom in alpha position with respect to the carboxy radical.

Still another exemplary method of preparation is to convert the acid first to its corresponding acyl chloride, as with sulfuryl chloride, according to the general reaction:

$$RCOOH + SOCl_2 \rightarrow RCOCl$$

then to brominate the acyl chloride with bromine, $$RCOCl + Br_2 \rightarrow RBrCOCl$$

and finally to hydrolyze the bromoacyl chloride, $$RBrCOCl + H_2O \rightarrow RBrCOOH$$

to obtain the desired brominated acid. In this synthesis the bromine likewise attaches to the carbon atom in alpha position to the carboxy radical.

By using one or the other of the above methods, many brominated acids corresponding to the type formula heretofore given may be made. An exemplary number of such acids will be set forth hereinafter, although it is to be understood that the invention is by no means limited to the acids specifically described.

In the first group of examples, comprising Examples 1 through 6, the R of the type formula is uniformly methyl, the Y is uniformly hydrogen, and the R' is uniformly hydrogen, while the number $n$ of methylene groups is varied from zero to 5.

In the second group of examples, comprising Examples 7 through 24, R is likewise uniformly methyl and R' is uniformly hydrogen, $n$ varies from 1 to 6, but the important variation is in Y, which is shown as a wide range of hydrocarbon radicals, aryl-oxy-alkyls, and alkyl-oxy-alkyls.

The third group of examples, comprising Examples 25 through 29, shows Y as a carboxy radical, $n$ varying from 1 to 5 as in the first group.

The fourth group of examples, comprising Examples 30, 31, and 32, shows principally variations of R through the lower alkyls and aryls.

The fifth and last group of examples, comprising Examples 33 through 37, shows principally variations of R' throughout a wide variety of hydrocarbon radicals.

Proceeding now to the various specific examples:

EXAMPLE 1

*1-bromo-1-carboxy-2,2-dimethylpropane (or alpha-bromo tertiary butyl acetic acid)*

This acid corresponds to the formula $$(CH_3)_3C—CHBr—COOH$$

from which it is seen that Y and R' of the type formula are both —H, R is —CH$_3$, and $n$ is zero.

This acid may be satisfactorily made from tertiary butyl acetic acid, which is described in detail in Whitmore et al. Patent No. 2,004,066, dated June 4, 1935, by brominating it, according to the following exemplary procedure:

23 grams of tertiary butyl acetic acid (prepared as set forth in Whitmore et al. Patent No. 2,004,066, dated June 4, 1935) and 13 cc. of dry bromide (a 10% excess) are placed in a 200 cc. flask fitted with a reflux condenser arranged for collecting the evolved hydrogen bromide in water. One cc. of phosphorus trichloride is added and the mixture is warmed at 60° to 70° C. for three hours and then at 100° C. for an hour. Hydrogen bromide is evolved and all of the bromine disappears. The mixture is then distilled at a reduced pressure (4.5 mm.), yielding 21 grams of alpha-bromo tertiary butyl acetic acid, which is a white crystalline solid melting at 72° to 73° C., and boiling at 102° to 109° C., under 2 to 4 mm. pressure.

EXAMPLE 2

*1-bromo-1-carboxy-3,3-dimethylbutane (or alpha-bromo tertiary butyl propionic acid)*

This acid, which is the next higher homolog of the acid of Example 1, has the formula:

$$(CH_3)_3C—CH_2—CHBr—COOH$$

from which it is seen that it differs from the acid of Example 1 in that $n$ is 1 instead of zero.

This acid may be prepared by brominating tertiary butyl propionic acid. Inasmuch as the latter acid is not elsewhere described, however, a detailed method for its preparation is given below:

A Grignard compound, 3,3-dimethylbutyl magnesium bromide, is first made from 3,3-dimethyl-1-bromo butane, which is itself described in the patent of one of us (Whitmore) together with Walter R. Trent, No. 2,022,485, dated November 26, 1935. The following procedure, for example, may be used:

12 grams of metallic magnesium is weighed into a 500 cc. 3-necked flask fitted with a mercury-sealed stirrer, a reflux condenser, and a dropping funnel. A crystal of iodine is dissolved in 10 cc. of ether and the solution is added to the magnesium. Approximately 5 grams of 3,3-dimethyl-1-bromobutane is now added to the magnesium, and the reaction starts in a few minutes. 30 cc. of ether is then added to the mixture. An additional portion of 78 grams of 3,3-dimethyl-1-bromobutane is diluted with 200 cc. of ether and the ether solution is then slowly added to the mixture over a period of, say, seven hours. After permitting the mixture to stand over night, it is refluxed for about two hours.

The Grignard reagent as thus prepared is next treated with carbon dioxide to convert it to the desired tertiary butyl propionic acid. The following procedure, for example, may be used:

The Grignard reagent prepared as above is cooled in an ice-salt bath, and carbon dioxide (dried by passage through sulfuric acid) is bubbled through it for, say, 4½ hours. After standing over night the solution is again saturated with carbon dioxide, say, for 1½ hours. The solution now becomes mushy on standing. It is next decomposed by pouring it on ice, and the resultant solution made acid with 25% sulfuric acid. Two clear layers form. The ether layer is separated and the water layer is steam distilled, collecting a total volume of about 500 cc. The acid layer of the distillate is separated and added to the original ether layer. The water layer is twice extracted with 100 cc. portions of ether, and the extracts are likewise added to the original ether layer. The combined ether portions are then dried with 40 grams of sodium sulfate, and are then distilled, preferably under vacuum. The desired acid comes over at 110–111° C. under 15 to 16 mm. pressure, and has an index of refraction $$(n_D^{20})$$

value of 1.4214 to 1.4219. Its melting point is about 2–3° C.

The tertiary butyl propionic acid thus obtained is then converted into its acyl chloride. For example, 27.7 grams of the acid is placed in a flask fitted with a reflux condenser, and 30 grams of SOCl$_2$ is added over the period of about one-half hour. The reaction mixture is then heated on a steam bath for two hours. A distilling head is then substituted for the reflux condenser, and heating is continued for about two hours to remove the excess SOCl$_2$.

The acyl chloride is then brominated. For example, 40 grams of liquid bromine is added, over a period of about two hours, to the flask containing the acyl chloride, and the mixture is then heated on a steam bath for about eight hours. It is then distilled to obtain the alpha-brominated acyl chloride, which boils at 76.0 to 85.0° C. under 14 to 15 mm. pressure, and has a $$n_D^{20}$$

value of about 1.4870.

To 31.1 grams of this brominated acyl chloride is added about three times its volume of water, and the mixture is heated at about 50 to 60° C. for 18 hours. The lower layer is separated and washed several times with water. It is then cooled in a salt-ice bath until it solidifies. It may be purified in the usual manner to give crystalline alpha-bromo tertiary butyl propionic acid, which is colorless and melts at 22 to 24° C.

EXAMPLE 3

*1-bromo-1-carboxy-4,4-dimethylpentane (or alpha-bromo tertiary butyl butyric acid)*

This acid corresponds to the formula:

$$(CH_3)_3C—CH_2—CH_2—CHBr—COOH$$

from which it will be seen that it differs from Examples 1 and 2 only in that $n$ is 2.

It may be made by brominating the acid 1-carboxy-4,4-dimethylpentane, which is itself disclosed as Example 1 in Whitmore et al. Patent No. 2,032,159, granted February 25, 1936, by either of the bromination procedures hereinbefore described.

EXAMPLE 4

*1-bromo-1-carboxy-5,5-dimethylhexane*
*(or alpha-bromo tertiary butyl valeric acid)*

This acid corresponds to the formula:

(CH₃)₃C-CH₂-CH₂-CH₂-CHBr-COOH from which it will be seen that it differs from Examples 1, 2, and 3, only in that n is 3.

It may be made by brominating the acid 1-carboxy-5,5-dimethylhexane which is itself disclosed as Example 2 in said Patent No. 2,032,159, by either of the bromination procedures hereinbefore described.

EXAMPLE 5

*1-bromo-1-carboxy-6,6-dimethylheptane*
*(or alpha-bromo tertiary butyl caproic acid)*

This acid corresponds to the formula:

(CH₃)₃C-CH₂-CH₂-CH₂-CH₂-CHBr-COOH from which it will be seen that it differs from Examples 1 to 4 only in that n is 4.

It may be made by brominating the acid 1-carboxy-6,6-dimethylheptane, which is itself disclosed as Example 4 in said Patent No. 2,032,159, by either of the bromination procedures hereinbefore described.

EXAMPLE 6

*1-bromo-1-carboxy-7,7-dimethyloctane*
*(or alpha-bromo tertiary butyl oenanthic acid)*

This acid corresponds to the formula:

(CH₃)₃C-CH₂-CH₂-CH₂-CH₂-CH₂-CHBr-COOH from which it will seen that it differs from Examples 1–5 only in that n is 5.

It may be made by brominating the acid 1-carboxy-7,7-dimethyloctane, which is itself disclosed as Example 6 in said Patent No. 2,032,159, by either of the bromination procedures hereinbefore described.

EXAMPLE 7

*2-bromo-2-carboxy-4,4-dimethylpentane*

This acid corresponds to the formula:

(CH₃)₃C-CH₂-CBr(CH₃)-COOH from which it will be seen that it differs from Example 2 only in that Y is methyl.

It may be made by brominating the acid 2-carboxy-4,4-dimethyl-pentane, which is itself disclosed under its synonymous name 2,2-dimethylpropyl-methyl-acetic acid, as an intermediate compound in Example 2 of said application Serial No. 64,338, by either of the bromination procedures hereinbefore described.

EXAMPLE 8

*2-bromo-2-carboxy-6,6-dimethylheptane*

This acid corresponds to the formula:

(CH₃)₃C-CH₂-CH₂-CH₂-CBr(CH₃)-COOH from which it will be seen that it differs from Example 7 only in that n is 3.

It may be made by brominating, by either of the bromination procedures hereinbefore described, the acid 2-carboxy-6,6-dimethylheptane, which in turn may be made by a simple procedure from the malonic ester, 2,2-dimethyl-6,6-dicarbethoxyheptane, disclosed as Example 12 of Whitmore, Jones and Noll copending patent application Serial No. 63,212, filed February 10, 1936. An applicable procedure for converting the malonic ester to the acid is as follows:

The diethyl malonic ester is first hydrolyzed to form a dibasic acid, according to the reaction:

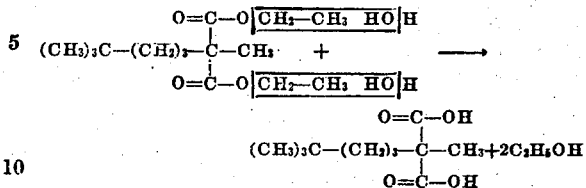

The hydrolysis may be accomplished, for example, by refluxing the ester with potassium hydroxide in aqueous solution for several hours.

The dibasic acid may then be converted into the monobasic acid by removing a carbon dioxide molecule, according to the reaction:

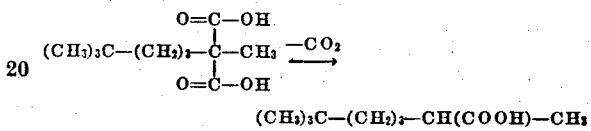

(CH₃)₃C—(CH₂)₃—CH(COOH)—CH₃

The removal of the carbon dioxide may be accomplished by making acid the solution of the dibasic acid with hydrochloric acid, cooling it, allowing two layers to separate, drawing off the upper one, and heating it to drive out carbon dioxide. The desired monobasic acid may be dried, as with calcium chloride, and then heated in a flask at a relatively high temperature for several hours, and finally purified by fractionation.

EXAMPLE 9

*3-bromo-3-carboxy-6,6-dimethylheptane*

This acid corresponds to the formula:

(CH₃)₃C-CH₂-CH₂-CBr(CH₂-CH₃)-COOH from which it will be seen that it differs from Example 7 only in that n and Y are 2 and ethyl, respectively.

It may be made by brominating the acid 3-carboxy-6,6-dimethylheptane, by either of the bromination procedures hereinbefore described. The acid 3-carboxy-6,6-dimethylheptane may be prepared, as by the procedure of Example 8 hereof, from the malonic ester 2,2-dimethyl-5,5-dicarbethoxyheptane, which is itself disclosed as Example 4 of said application Serial No. 63,212.

EXAMPLE 10

*3-bromo-3-carboxy-7,7-dimethyloctane*

This acid corresponds to the formula:

(CH₃)₃C-CH₂-CH₂-CH₂-CBr(CH₂-CH₃)-COOH from which it will be seen that it differs from Example 9 only in that n is 3.

It may be made by brominating the acid 3-carboxy-7,7-dimethyloctane, by either of the bromination procedures hereinbefore described. The acid 3-carboxy-7,7-dimethyloctane may be prepared, as by the procedure of Example 8 hereof, from the malonic ester 2,2-dimethyl-6,6-dicarbethoxyoctane, which is itself disclosed as Example 5 of said application Serial No. 63,212.

EXAMPLE 11

*3-bromo-3-carboxy-8,8-dimethylnonane*

This acid corresponds to the formula:

(CH₃)₃C—CH₂—CH₂—CH₂—CH₂—
　　　　　　　　　CBr(CH₂—CH₃)—COOH from which it will be seen that it differs from Examples 9 and 10 only in that n is 4.

It may be made by brominating the acid 3-carboxy-8,8-dimethylnonane, by either of the bromination procedures hereinbefore described. The acid 3-carboxy-8,8-dimethylnonane may be prepared, as by the procedure of Example 8 hereof, from the malonic ester 2,2-dimethyl-7,7-dicarbethoxynonane, which is itself disclosed as Example 6 of said application Serial No. 63,212.

EXAMPLE 12

*3-bromo-3-carboxy-9,9-dimethyldecane*

This acid corresponds to the formula:

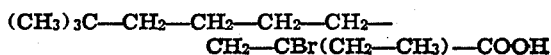

from which it will be seen that it differs from Examples 9, 10, and 11 only in that $n$ is 5.

It may be made by brominating the acid 3-carboxy-9,9-dimethyldecane, by either of the bromination procedures hereinbefore described. The acid 3-carboxy-9,9-dimethyldecane may be prepared, as by the procedure of Example 8 hereof, from the malonic ester 2,2-dimethyl-8,8-dicarbethoxydecane, which is itself disclosed as Example 7 of said application Serial No. 63,212.

EXAMPLE 13

*3-bromo-3-carboxy-10,10-dimethylundecane*

This acid corresponds to the formula:

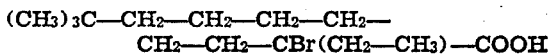

from which it will be seen that it differs from Examples 9–12 only in that $n$ is 6.

It may be made by brominating the acid 3-carboxy-10,10-dimethylundecane, by either of the bromination procedures hereinbefore described. The acid 3-carboxy-10,10-dimethylundecane may be prepared, as by the procedure of Example 8 hereof, from the malonic ester 2,2-dimethyl-9,9-dicarbethoxyundecane, which is itself disclosed as Example 8 of said application Serial No. 63,212.

EXAMPLE 14

*4-bromo-4-carboxy-8,8-dimethylnonane*

This acid corresponds to the formula:

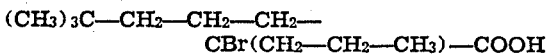

from which it will be seen that it differs from Example 10 only in that Y is propyl.

It may be made by brominating the acid 4-carboxy-8,8-dimethylnonane, by either of the bromination procedures hereinbefore described. The acid 4-carboxy-8,8-dimethylnonane may be prepared, as by the procedure of Example 8 hereof, from the malonic ester 2,2-dimethyl-6,6-dicarbethoxynonane, which is itself disclosed as Example 13 of said application Serial No. 63,212.

EXAMPLE 15

*5-bromo-5-carboxy-9,9-dimethyldecane*

This acid corresponds to the formula:

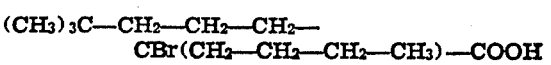

from which it will be seen that it differs from Examples 10 and 15 only in that Y is butyl.

It may be made by brominating the acid 5-carboxy-9,9-dimethyldecane, by either of the bromination procedures hereinbefore described. The acid 5-carboxy-9,9-dimethyldecane may be prepared, as by the procedure of Example 8 hereof, from the malonic ester 2,2-dimethyl-6,6-dicarbethoxydecane, which is itself disclosed as Example 14 of said application Serial No. 63,212.

EXAMPLE 16

*5-bromo-5-carboxy-2,2,8,8-tetramethylnonane*

This acid corresponds to the formula:

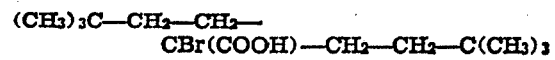

from which it will be seen that it differs from Example 9 only in that Y is 3,3-dimethylbutyl. This substance is of especial interest, as it contains two quaternary carbon atoms.

It may be made by brominating the acid 5-carboxy-2,2,8,8-tetramethylnonane, by either of the bromination procedures hereinbefore described. The acid 5-carboxy-2,2,8,8-tetramethylnonane may be prepared, as by the procedure of Example 8 hereof, from the malonic ester 2,2,8,8-tetramethyl-5,5-dicarbethoxynonane. Since this malonic ester is not elsewhere described, its preparation is given below.

In 300 cc. of absolute alcohol, 11.5 grams of metallic sodium and 123 grams of 1,1-dicarbethoxy-4,4-dimethylpentane (the preparation of which is disclosed as Example 1 of said application Serial No. 63,212) are placed. The mixture is stirred for ½ hour, and 82 grams of 3,3-dimethyl - 1 - bromobutane (said Patent No. 2,022,485) is then added, and the mixture refluxed for 8 hours. A precipitate forms. After the refluxing, the alcohol is distilled off and 150 cc. of water is added to the residue. The ester layer which separates is withdrawn and washed with water, and then dried with sodium sulfate. Upon distillation thereof, the desired malonic ester, boiling at 111 to 118° C. under 2 to 3 mm. pressure, has an index of refraction value $$(n_D^{20})$$

of 1.4358 to 1.4360.

EXAMPLE 17

*6-bromo-6-carboxy-2,2,10,10-tetramethylundecane*

This acid corresponds to the formula:

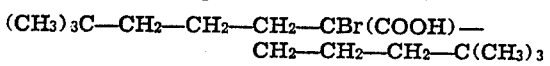

from which it will be seen that it differs from Example 10 only in that Y is 4,4-dimethylamyl. Like Example 16, it has two quaternary carbon atoms.

It may be made by brominating the acid 6-carboxy-2,2,10,10-tetramethylundecane, which is itself disclosed as Example 8 in said Patent No. 2,032,159, by either of the bromination procedures hereinbefore described.

EXAMPLE 18

*1-bromo-1-carboxy-1-cyclopentyl-5,5-dimethylhexane*

This acid corresponds to the formula:

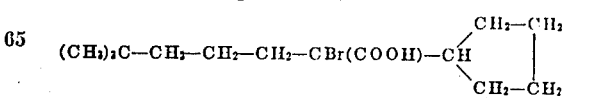

from which it will be seen that it differs from Example 10 only in that Y is cyclopentyl.

It may be made by brominating the acid 1-carboxy-1-cyclopentyl - 5,5 - dimethylhexane, by either of the bromination procedures hereinbefore described. The acid 1-carboxy-1-cyclopentyl-5,5-dimethylhexane may be prepared, as by the procedure of Example 8 hereof, from the malonic ester 1,1-dicarbethoxy-1-cyclopentyl-5,5-dimethylhexane, which is itself disclosed as Example 18 of said application Serial No. 63,212.

EXAMPLE 19

*1-bromo-1-carboxy-1-cyclohexyl-5,5-dimethylhexane*

This acid corresponds to the formula:

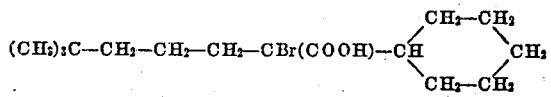

from which it will be seen that it differs from Example 10 only in that Y is cyclohexyl.

It may be made by brominating the acid 1-carboxy-1-cyclohexyl-5,5-dimethylhexane, by either of the bromination procedures hereinbefore described. The acid 1-carboxy-1-cyclohexyl-5,5-dimethylhexane may be prepared, as by the procedure of Example 8 hereof, from the malonic ester 1,1-dicarbethoxy-1-cyclohexyl-5,5-dimethylhexane, which is itself disclosed as Example 19 of said application Serial No. 63,212.

EXAMPLE 20

*1-bromo-1-carboxy-1-phenyl-5,5-dimethylhexane*

This acid corresponds to the formula:

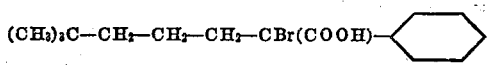

from which it will be seen that it differs from Example 10 only in that Y is phenyl.

It may be made by brominating the acid 1-carboxy-1-phenyl-5,5-dimethylhexane, by either of the bromination procedures hereinbefore described. The acid 1-carboxy-1-phenyl-5,5-dimethylhexane may be prepared, as by the procedure of Example 8 hereof, from the malonic ester 1,1-dicarbethoxy-1-phenyl-5,5-dimethylhexane, which is itself disclosed as Example 21 of said application Serial No. 63,212.

EXAMPLE 21

*2-bromo-2-carboxy-1-phenyl-6,6-dimethylheptane*

This acid corresponds to the formula:

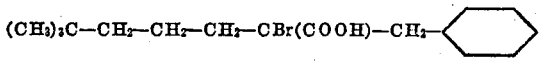

from which it will be seen that it differs from Example 10 only in that Y is benzyl.

It may be made by brominating the acid 2-carboxy-1-phenyl-6,6-dimethylheptane, by either of the bromination procedures hereinbefore described. The acid 2-carboxy-1-phenyl-6,6-dimethylheptane may be prepared, as by the procedure of Example 8 hereof, from the malonic ester, 2,2-dicarbethoxy-1-phenyl-6,6-dimethylheptane, which is itself disclosed as Example 22 of said application Serial No. 63,212.

EXAMPLE 22

*3-bromo-3-carboxy-1-phenyl-7,7-dimethyloctane*

This acid corresponds to the formula:

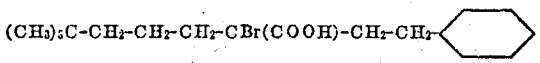

from which it will be seen that it differs from Example 10 only in that Y is beta-phenylethyl.

It may be made by brominating the acid 3-carboxy-1-phenyl-7,7-dimethyloctane by either of the bromination procedures hereinbefore described. The acid 3-carboxy-1-phenyl-7,7-dimethyloctane may be prepared, as by the procedure of Example 8 hereof, from the malonic ester 3,3-dicarbethoxy-1-phenyl-7,7-dimethyloctane, which is itself disclosed as Example 23 of said application Serial No. 63,212.

EXAMPLE 23

*3-bromo-3-carboxy-1-phenoxy-7,7-dimethyloctane*

This acid corresponds to the formula:

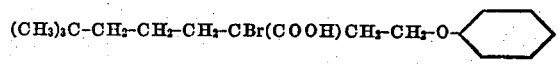

from which it will be seen that it differs from Example 10 only in that Y is phenoxyethyl.

It may be made by brominating the acid 3-carboxy-1-phenoxy-7,7-dimethyloctane, by either of the bromination procedures hereinbefore described. The acid 3-carboxy-1-phenoxy-7,7-dimethyloctane may be prepared, as by the procedure of Example 8 hereof, from the malonic ester 3,3-dicarbethoxy-1-phenoxy-7,7-dimethyloctane, which is itself disclosed as Example 24 of said application Serial No. 63,212.

EXAMPLE 24

*3-bromo-3-carboxy-1-ethoxy-7,7-dimethyloctane*

This acid corresponds to the formula:

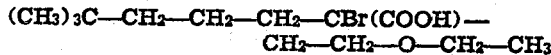

from which it will be seen that it differs from Example 10 only in that Y is ethoxyethyl.

It may be made by brominating the acid 3-carboxy-1-ethoxy-7,7-dimethyloctane, by either of the bromination procedures hereinbefore described. The acid 3-carboxy-1-ethoxy-7,7-dimethyloctane may be made, as by the procedure of Example 8 hereof, from the malonic ester 3,3-dicarbethoxy-1-ethoxy-7,7-dimethyloctane, which is itself disclosed as Example 25 of said application Serial No. 63,212.

EXAMPLE 25

*1-bromo-1,1-dicarboxy-3,3-dimethylbutane*

This acid corresponds to the formula:

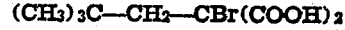

from which it will be seen that it differs from Example 2 only in that Y is carboxy.

It may be made by brominating the acid 1,1-dicarboxy-3,3-dimethylbutane, by either of the bromination procedures hereinbefore described. Since the preparation of said acid 1,1-dicarboxy-3,3-dimethylbutane is not elsewhere given, directions are given below:

10.6 grams of the ethyl ester (Example 37 hereof) of 1-bromo-1-carboxy-3,3-dimethylbutane (Example 2 hereof) is dissolved in 8 cc. of 80% ethanol and then treated with 3 grams of potassium cyanide and refluxed on a steam bath for 48 hours. The solution, which contains the nitrile, 1-cyano-1-carbethoxy-3,3-dimethylbutane, turns dark red. This solution, freed of the solid which separates, is refluxed for 73 hours with potassium hydroxide, and then washed into a casserole with a little water and evaporated to dryness on a steam bath. The residue is dissolved in a little water, cooled in a salt-ice bath, and made acid with cold hydrochloric acid. An oil separates which does not solidify on cooling. The oil is extracted from the acid solution with successive portions of ether, and the ether is then

Example 26

*1-bromo-1,1-dicarboxy-4,4-dimethylpentane*

This acid corresponds to the formula:

(CH₃)₃C—CH₂—CH₂—CBr(COOH)₂ from which it will be seen that it differs from Example 25 only in that n is 2.

It may be made by brominating the acid 1,1-dicarboxy-4,4-dimethylpentane, by either of the bromination procedures hereinbefore described. The acid 1,1-dicarboxy-4,4-dimethylpentane may be made, as by using only the first part of the procedure of Example 8 hereof, from the malonic ester 1,1 - dicarbethoxy - 4,4 - dimethylpentane, which is itself disclosed as Example 1 of said application Serial No. 63,212.

Example 27

*1-bromo-1,1-dicarboxy-5,5-dimethylhexane*

This acid corresponds to the formula:

(CH₃)₃C—CH₂—CH₂—CH₂—CBr(COOH)₂ from which it will be seen that it differs from Examples 25 and 26 only in that n is 3.

It may be made by brominating the acid 1,1-dicarboxy-5,5-dimethylhexane, which is itself disclosed as Example 3 in said Patent No. 2,032,159, by either of the bromination procedures hereinbefore described.

Example 28

*1-bromo-1,1-dicarboxy-6,6-dimethylheptane*

This acid corresponds to the formula:

(CH₃)₃C—CH₂—CH₂—CH₂—CH₂—CBr(COOH)₂ from which it will be seen that it differs from Examples 25, 26, and 27 only in that n is 4.

It may be made by brominating the acid 1,1-dicarboxy-6,6-dimethylheptane, which is itself disclosed as Example 5 in said Patent No. 2,032,159, by either of the bromination procedures hereinbefore described.

Example 29

*1-bromo-1,1-dicarboxy-7,7-dimethyloctane*

This acid corresponds to the formula:

(CH₃)₃C—CH₂—CH₂—CH₂—CH₂—CH₂—CBr(COOH)₂ from which it will be seen that it differs from Examples 25–28 only in that n is 5.

It may be made by brominating the acid 1,1-dicarboxy-7,7-dimethyloctane, which is itself disclosed as Example 7 in said Patent No. 2,032,159, by either of the bromination procedures hereinbefore described.

Example 30

*3-bromo-3-carboxy-7,7-dimethylnonane*

This acid corresponds to the formula:

(CH₃)₂(CH₃—CH₂)C—CH₂—CH₂—CH₂—CBr(COOH)—CH₂—CH₃ from which it will be seen that it differs from Example 10 only in that R is ethyl.

It may be made by brominating the acid 3-carboxy-7,7-dimethylnonane, by either of the bromination procedures hereinbefore described. The acid 3-carboxy-7,7-dimethylnonane may be prepared, as by the procedure of Example 8 hereof, from the malonic ester 3,3-dimethyl - 7,7 - dicarbethoxynonane, which is itself disclosed as Example 9 of said application Serial No. 63,212.

Example 31

*3-bromo-3-carboxy-9,9-dimethylundecane*

This acid corresponds to the formula:

(CH₃)₂(CH₃—CH₂)C—CH₂—CH₂—CH₂—CH₂—CH₂—CBr(COOH)—CH₂—CH₃ from which it will be seen that it differs from Example 30 only in that n is 5.

It may be made by brominating the acid 3-carboxy-9,9-dimethylundecane, by either of the bromination procedures hereinbefore described. The acid 3-carboxy-9,9-dimethylundecane may be prepared, as by the procedure of Example 8 hereof, from the malonic ester 3,3-dimethyl-9,9-dicarbethoxyundecane, which is itself disclosed as Example 10 in said application Serial No. 63,212.

Example 32

*3-bromo-3-carboxy-6- methyl - 6 - phenylheptane*

This acid corresponds to the formula:

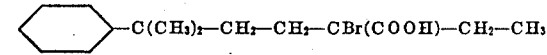

from which it will be seen that it differs from Example 9 only in that R is phenyl.

It may be made by brominating the acid 3-carboxy-6-methyl-6-phenylheptane, by either of the bromination procedures hereinbefore described. The acid 3-carboxy-6-methyl-6-phenylheptane may be prepared, as by the procedure of Example 8 hereof, from the malonic ester 2-methyl - 2 - phenyl - 5,5 - dicarbethoxy - heptane, which is itself disclosed as Example 11 of said application Serial No. 63,212.

Example 33

*1-bromo-1-carbethoxy-2,2 - dimethylpropane (alpha-bromo ethyl tertiary butyl acetate)*

This substance, which is the ethyl ester of the acid of Example 1, corresponds to the formula:

(CH₃)₃C—CHBr—COOCH₂—CH₃ from which it will be seen that it differs from Example 1 only in that R' is ethyl instead of hydrogen.

It may be made by reacting ethanol either with the acid (Example 1 hereof) 1-bromo-1-carboxy-2,2-dimethylpropane, or with the acyl chloride of said acid, which is easily prepared therefrom. The procedure is in general that set forth in detail in our Patent No. 2,060,154, granted November 10, 1936.

It is a colorless oily liquid, boiling at 93° C. under 23 mm. pressure, and has an index of refraction $(n_D^{20})$ value of 1.4510.

Example 34

*1-bromo-1-carb-benzyl-oxy-2,2 -dimethylpropane (alpha-bromo benzyl tertiary butyl acetate)*

This substance, which is the benzyl ester of the acid of Example 1, corresponds to the formula:

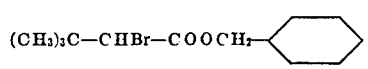

from which it will be seen that it differs from Example 1 only in that R' is benzyl instead of hydrogen.

It may be made by the procedure set forth in Example 33, using benzyl alcohol in place of the ethanol.

It is a colorless liquid, boiling at 145 to 147° C. under 4.5 mm. pressure, and has an index of refraction $(n_D^{20})$ value of 1.5160.

EXAMPLE 35

*1-bromo-1-carb-bornyl-oxy-2,2-dimethylpropane (alpha-bromo bornyl tertiary butyl acetate)*

This substance, which is the bornyl ester of the acid of Example 1, corresponds to the formula:

$(CH_3)_3C\!-\!CHBr\!-\!COO\!-\!C_{10}H_{17}$ from which it will be seen that it differs from Example 1 only in that R' is bornyl instead of hydrogen.

It may be made by the procedure set forth in Example 33, using borneol in place of the ethanol.

It is a colorless liquid, boiling at 148 to 153° C. under 4 to 5 mm. pressure, and has an index of refraction $(n_D^{20})$ value of 1.4876.

EXAMPLE 36

*1-bromo-1-carb-menthyl-oxy - 2,2 - dimethylpropane (alpha-bromo menthyl tertiary butyl acetate)*

This substance, which is the menthyl ester of the acid of Example 1, corresponds to the formula:

$(CH_3)_3C\!-\!CHBr\!-\!COO\!-\!C_{10}H_{19}$ from which it will be seen that it differs from Example 1 only in that R' is menthyl instead of hydrogen.

It may be made by the procedure set forth in Example 33, using menthol in place of the ethanol.

It is a heavy, viscous oil, boiling at 148 to 150° C. under 4 mm. pressure, and has an index of refraction $(n_D^{20})$ value of 1.4753.

EXAMPLE 37

*1-bromo-1-carbethoxy- 3,3 - dimethylbutane (alpha-bromo ethyl tertiary butyl propionate)*

This substance, which is the ethyl ester of the acid of Example 2, corresponds to the formula:

$(CH_3)_3C\!-\!CH_2\!-\!CHBr\!-\!COO\!-\!CH_2\!-\!CH_3$ from which it will be seen that it differs from Example 2 only in that R' is ethyl instead of hydrogen.

It may be made by the procedure set forth in Example 33, using 1-bromo-1-carboxy-3,3-dimethylbutane in place of the 1-bromo-1-carboxy-2,2-dimethylpropane. However, it is more easily made by converting the acid first to the acyl chloride. For example, to 28 grams of 1-bromo-1-carboxy-3,3-dimethylbutane is added 17 grams of SOCl₂, and the mixture is heated on a steam bath for ½ hour. 18 grams of absolute ethanol is then added to the mixture, and the heating is then continued for several hours. The product is then dried with sodium sulfate, filtered, and distilled to yield the desired ester.

It is a colorless liquid, boiling at 103° C. under 23 mm. pressure, and has an index of refraction $(n_D^{20})$ value of 1.4474 to 1.4505.

By similar methods the same and innumerable other esters can be prepared from all of the acids of Examples 1 to 32 hereof.

Throughout this application, all temperatures are recited in the centigrade scale, all pressures are recited in millimeters (mm.) of mercury, and all indices of refraction $(n_D^{20})$ are given with respect to the sodium-D line at 20° C.

The term "integer" is used herein as inclusive of the arithmetical whole number, zero (0).

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

We claim:

1. A halogenated compound corresponding to the type-formula:

$(CH_3)_2CR\!-\!(CH_2)_n\!-\!CBrY\!-\!COOR'$ where R is selected from the group consisting of the lower alkyl and aryl groups, n is a lower integer, Y is selected from the group consisting of hydrogen, hydrocarbon, aryl-oxy-alkyl, alkyl-oxy-alkyl, and carboxy radicals, and R' is selected from the group consisting of hydrogen and hydrocarbon radicals.

2. An alpha brominated aliphatic carboxylic acid containing a quarternary carbon atom in its structure.

3. A halogenated compound corresponding to the type-formula:

$(CH_3)_3C\!-\!CHBr\!-\!COOR$ where R is selected from the group consisting of hydrogen and hydrocarbon radicals.

4. Alpha-bromo tertiary butyl acetic acid.

5. 1-bromo-1-carboxy-3,3-dimethylbutane.

6. 1-bromo-1-carbethoxy-3,3-dimethylbutane.

7. A halogenated compound corresponding to the type formula:

$(CH_3)_2CR\!-\!(CH_2)_n\!-\!CBrY\!-\!COOR'$ where R is selected from the group consisting of the lower alkyl and aryl groups, n is a lower integer not less than 2, Y is selected from the group consisting of hydrogen, hydrocarbon, aryl-oxy-alkyl, alkyl-oxy-alkyl and carboxy radicals, and R' is selected from the group consisting of hydrogen and hydrocarbon radicals.

8. An alpha brominated aliphatic carboxylic acid having at least seven carbon atoms, at least one of which is a quaternary carbon atom, in its structure.

9. A halogenated compound corresponding to the type formula:

$(CH_3)_2CR\!-\!CBrY\!-\!COOR'$ where R is selected from the group consisting of the lower alkyl and aryl groups, Y is selected from the group consisting of hydrogen, hydrocarbon, aryl-oxy-alkyl, alkyl-oxy-alkyl, and carboxy radicals, and R' is selected from the group consisting of hydrogen and hydrocarbon radicals.

10. A halogenated compound corresponding to the type formula:

$$(CH_3)_2CR\text{—}(CH_2)_n\text{—}CHBr\text{—}COOR'$$

where R is selected from the group consisting of the lower alkyl and aryl groups, $n$ is a lower integer, and R' is selected from the group consisting of hydrogen and hydrocarbon radicals.

11. A halogenated compound corresponding to the type formula:

$$(CH_3)_2CR\text{—}(CH_2)_n\text{—}CBrY\text{—}COOH$$

where R is selected from the group consisting of the lower alkyl and aryl groups, $n$ is a lower integer, and Y is selected from the group consisting of hydrogen, hydrocarbon, aryl-oxy-alkyl, alkyl-oxy-alkyl and carboxy radicals.

FRANK C. WHITMORE.
AUGUST H. HOMEYER.